3,432,507
CERTAIN DIAZATRICYCLODODECADIENONES
AND THEIR PREPARATION
Leo A. Paquette, Columbus, Ohio, assignor to The Upjohn Company, Kalamazoo, Mich., a corporation of Delaware
No Drawing. Continuation-in-part of application Ser. No. 210,194, July 16, 1962. This application Dec. 4, 1963, Ser. No. 328,107
U.S. Cl. 260—293    7 Claims
Int. Cl. C07d 29/02; B01j 1/10

This application is a continuation-in-part of our copending application Ser. No. 210,194 filed July 16, 1962, now abandoned.

This invention relates to novel compositions of matter and to methods for their preparation and is particularly directed to certain diazatricyclododecadienones and their preparation.

The novel diazatricyclododecadienones of the invention are represented by the following structural formula:

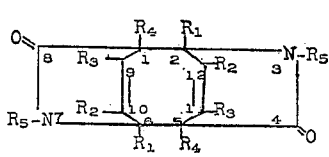

(I)

wherein $R_1$, $R_2$, $R_3$, and $R_4$ are selected from the group consisting of hydrogen, methyl, and ethyl; and $R_5$ contains from 3 to 12 carbon atoms, inclusive, and is selected from the group consisting of alkenyl, cycloalkenyl, aralkenyl, and (alkoxy)$_n$-aralkenyl wherein $n$ is an integer of from 1 to 3, inclusive. Examples of alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 4-methyl-2-pentenyl, 1-ethyl-2-butenyl, 2-ethyl-2-pentenyl, 4,4-dimethyl-2-pentenyl, 2-methyl-2-heptenyl, 4,4-diethyl-2-pentenyl, 4-methyl-4-undecenyl, and 5,5,7,7-tetramethyl-2-octenyl. Examples of cycloalkenyl are 2-cyclobuten-1-yl (from 3-bromo-cyclobutene), 1-cyclobuten-1-ylmethyl, 2-cyclopenten-1-yl, 2-methyl-2-cyclopenten-1-yl, 2-methylenecyclohexyl, 5-methyl-2-cyclohexen-1-yl, 4-methyl-2-cyclohexen-1-yl, 2-methyl-2-cyclohexen-1-yl, 2-(2-cyclohexen-1-yl)ethyl, 2-cyclohexen-1-ylmethyl, 2,6-dimethyl-2-cyclohexen-1-yl, 2-ethyl-2-cyclohexen-1-yl, 2-cycloocten-1-yl, 2,6,6-trimethyl-2-cyclohexen-1-yl, 2-cyclononen-1-yl, 4-(2-cyclopenten-1-yl)butyl, 2-cyclodecen-1-yl, 2-cycloundecen-1-yl, and 2-cyclododecen-1-yl. Examples of aralkenyl are styryl and cinnamyl. Examples of (alkoxy)$_n$-aralkenyl are 2-, 3-, and 4-methoxystyryl, 3,4-dimethoxystyryl, 3,4,5-trimethoxyoxystyryl, 2-, 3-, and 4-methoxycinnamyl, 3,4-dimethoxycinnamyl, and 3,4,5-trimethoxycinnamyl.

The novel compounds of the invention (Formula I) can be hydrogenated with hydrogen in an organic solvent, for example, acetic acid or a lower-alkanol, in the presence of a catalyst effective to saturate olefinic double bonds, for example, platinum or palladium oxides, to a novel compound having the following structure:

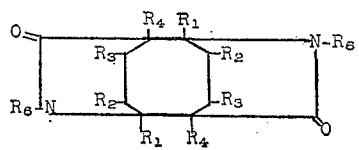

(II)

wherein $R_1$, $R_2$, $R_3$, and $R_4$ are as given above and $R_6$ is dihydro-$R_5$ wherein $R_5$ is as given above.

The latter compounds (Formula II) can be reduced with lithium aluminum hydride to a compound of the following formula:

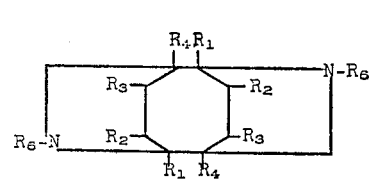

(III)

wherein $R_1$, $R_2$, $R_3$, $R_4$, and $R_6$ are as given above.

The compounds of Formula III are nitrogenous bases and as such can exist in both the protonated and nonprotonated form according to the pH of the environment. The nonprotonated form can be oxidized, with hydrogen peroxide for example, to form the N-oxide. The N-oxide also can exist in both the protonated and nonprotonated form according to the pH of the environment. The protonated forms can be isolated as acid addition salts which are useful for upgrading the free base and free base N-oxide forms, i.e., the nonprotonated forms. Suitable acids for this purpose are hydrochloric acid, sulfuric acid, phosphoric acid, thiocyanic acid, fluosilicic acid, picric acid, Reinecke's acid, azobenzenesulfonic acid, and the like. The acid addition salt can be formed by neutralizing the free base or free base N-oxide with the appropriate acid by metathesis of a simple acid addition salt such as the hydrochloride or sulfate with another salt of the desired acid.

The novel diazatricyclododecanes of the invention (Formula III) are useful intermediates. Thus the condensation products obtained from the thiocyanic acid addition salts of compounds of Formula III and formaldehyde according to U.S. Patents 2,425,320 and 2,606,155 are useful as pickling inhibitors, and the fluosilicic acid addition salts of compounds of Formula III are useful as mothproofing agents according to U.S. Patents 1,915,334 and 2,075,359.

The compounds of Formula III can also exist in the form of quaternary ammonium salts, such for example, as those obtained by coordinating the free base form with a lower-alkyl halide, for example, methyl, ethyl, propyl, butyl, pentyl, hexyl, heptyl, and octyl chloride, including the isomers thereof. The quaternary ammonium salts are useful for forming the corresponding fluosilicic acid salts which are useful as mothproofing agents. These fluosilicic acid salts can be formed by metathesis with an inorganic fluosilicate or by forming the quaternary ammonium hydroxide (by treating the quaternary ammonium salt with an equivalent of base, e.g., sodium hydroxide) and neutralizing it with fluosilicic acid.

The novel compounds of the invention (Formula I) can be prepared by the photodimerization of 2-pyridone having the formula:

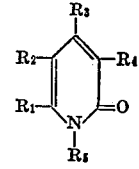

IV wherein $R_1$, $R_2$, $R_3$, $R_4$, and $R_5$ are as given above. The photodimerization is advantageously effected in aqueous solution at room temperature (about 20° to about 30° C.) because of the ease with which the dimers can be isolated. For the more insoluble 2-pyridones, an organic solvent, for example, ethanol or other lower-alkanol, benzene, toluene, hexane, chloroform, carbon tetrachloride, diethyl ether or other di-lower-alkyl ethers, and the like, can be used. Higher or lower temperatures, say from about 0° to about 75° C., can be used. The light source can be any ultraviolet lamp, filtered or unfiltered, giving off radiations in the wave length of about 240 to 260 millimicrons.

The starting compounds IV can be prepared by alkylating 2-pyridone or a C-alkyl-2-pyridone by the procedure of Räth [Ann. 489, 107 (1931)], according to the following equation:

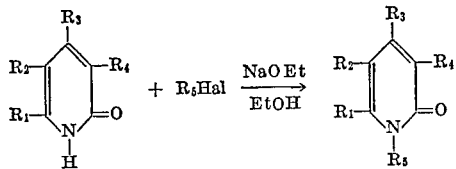

wherein Hal is halogen, e.g., chlorine, bromine, or iodine, and $R_1$, $R_2$, $R_3$, $R_4$, and $R_5$ are as given above. Alternatively, they can be prepared by alkylating pyridine or a C-alkylpyridine and oxidizing with alkali metal ferricyanide by the procedure of U.S. Patent 1,941,312 according to the following equations:

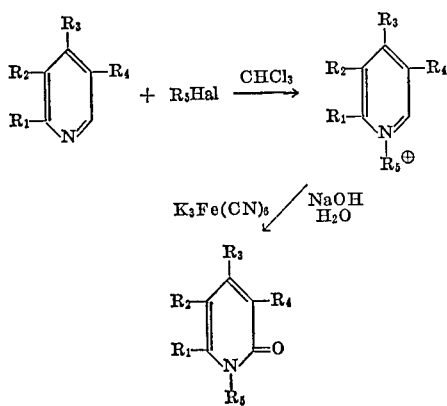

wherein Hal and $R_1$, $R_2$, $R_3$, $R_4$, and $R_5$ are as given above. Another procedure that can be used is that of Bradlow and Vanderwerf [J. Org. Chem. 16, 73 (1951)] according to the following equations:

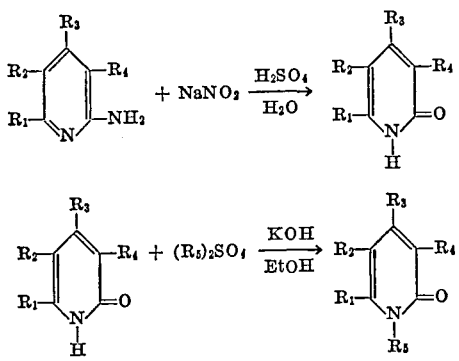

wherein $R_1$, $R_2$, $R_3$, $R_4$, and $R_5$ are as given above.

The invention can now be more fully understood by reference to the following examples which are given by way of illustration and in which parts and percentages are by weight unless otherwise specified, for example:

$R_5$=allyl

Part A.—1-allyl-2(1H)-pyridone and its hydrochloride

The procedure of Räth (supra) was applied to allyl bromide. From 95.1 g. (1.0 mole) of 2-pyridone and 133 g. (1.1 mole) of allyl bromide there was obtained 110 g. (81.5%) of 1-allyl-2(1H)-pyridone as a colorless liquid, B.P. 93–97° C. (1.5 mm.); $n_D^{23}$ 1.5584. A sample of this material was converted to its hydrochloride, hygroscopic white prisms from ethanol-ether, M.P. 124–125° C.

$\lambda_{Max.}^{EtOH}$ 229 m$\mu$ ($\epsilon$=6,660) and 302 m$\mu$ ($\epsilon$=5,500)

Analysis.—Calc'd for $C_8H_{10}ClNO$: C, 55.98; H, 5.87; N, 8.16. Found: C, 56.25; H, 6.12; N, 8.31.

Part B.—3,7-diallyl-3,7-diazatricyclo[4.2.2.2$^{2,5}$]-dodeca-9,11-diene-4,8-dione A solution of 50.0 g. (0.37 mole) of 1-allyl-2-(1H)-pyridone in 300 ml. of water was irradiated for 32 hr. with a 200 watt unfiltered mercury vapor ultraviolet lamp. The precipitated white solid was filtered to afford 6.5 g. (13.0%) of product, M.P. 192–193° C. The pure photodimer, 3,7 - diallyl - 3,7 - diazatricyclo[4.2.2.2$^{2,5}$]dodeca-9,11-diene-4,8-dione, was obtained as shiny white prisms from ethanol-ether, M.P. 198° C.

Analysis.—Calc'd for $C_{16}H_{18}N_2O_2$: C, 71,09; H, 6.71; N, 10.36. Found: C, 71.53; H, 6.67; N, 10.50. M.W. Calc'd 270; Found: 277.

In tests for pharmacodynamic activity in mice, this compound displayed sedative activity.

Part C.—3,7-dipropyl-3,7-diazatricyclo[4.2.2.2$^{2,5}$]-dodecane-4,8-dione

A 1.70 g. (0.006 mole) sample of the photodimer of part B in 50 ml. of ethanol containing 200 mg. of platinum oxide was hydrogenated in a Parr apparatus. The catalyst was filtered and the filtrate was concentrated to give 1.65 g. (97.0%) of 3,7-dipropyl-3,7-diazatricyclo [4.2.2.2$^{2,5}$]dodecane-4,8-dione as a white solid, M.P. 203–206° C. Pure product was obtained as white prisms from ethanol-ether, M.P. 210–211° C.

Analysis.—Calc'd for $C_{16}H_{26}N_2O_2$: C, 69.03%; H, 9.41; N, 10.06. Found: C, 68.89; H, 9.11; N, 10.28.

Part D.—3,7-dipropyl-3,7-diazatricyclo[4.2.2.2$^{2,5}$]-dodecane dihydrochloride and free base To a stirred slurry of 19.0 g. (0.50 mole) of lithium aluminum hydride in 350 ml. of dry purified tetrahydrofuran was added in portions of a slurry of 42.8 g. (0.154 mole) of the 3,7-dipropyl-3,7-diazatricyclo[4.2.2.2$^{2,5}$] dodecane-4,8-dione of Part C in 400 ml. of the same solvent. The resulting mixture was refluxed with stirring for 2 hr. and allowed to stand overnight at room temperature. To the rapidly stirred mixture cooled in ice, there was added 19 ml. of water, 57 ml. of 25% sodium hydroxide solution, and 19 ml. of water in that order. The precipitated salts were filtered and washed well with ether and methylene chloride. The combined filtrates were dried, filtered and evaporated to give, after thorough drying a solid which was converted directly to its dihydrochloride. Recrystallization from ethanol-ether gave pure 3,7 - dipropyl-3,7-diazatricyclo[4.2.2.2$^{2,5}$]dodecane dihydrochloride. A 5.5 g. (0.017 mole) sample of the dihydrochloride was dissolved in 20 ml. of water and to the solution was added 50 ml. of concentrated ammonium hydroxide. The white solid which separated was extracted with two 100-ml. portions of methylene chloride. The combined organic layers were dried, filtered, and evaporated to afford 3,7-dipropyl-3,7-diazatricyclo [4.2.2.2$^{2,5}$]dodecane free base.

By substituting the allyl bromide in the above example by the appropriate $R_5Cl$ or $R_5Br$, for example, where $R_5$ is 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-3-butenyl, 3-pentenyl, 2,3-dimethyl-2-butenyl, 1,1,2-trimethylallyl, 1,3-dimethyl-2-butenyl, 4-methyl-2-pentenyl, 1-ethyl-2-butenyl, 2-ethyl-2-pentenyl, 4,4-dimethyl-2-pentenyl, 2-methyl-2-heptenyl, 4,4-diethyl-2-pentenyl, 4-methyl-4-undecenyl, 5,5,7,7-tetramethyl-2-octenyl, 2-cyclobuten-1-yl, 1-cyclobuten-1-ylmethyl, 2-cyclopenten-1-yl, 2-methyl-2-cyclopenten-1-yl, 2-methylenecyclohexyl, 5-methyl-2-cyclohexen-1-yl, 4-methyl-2-cyclohexen-1-yl, 2-methyl-2-cyclohexen-1-yl, 2-(2-cyclohexen-1-yl)ethyl, 2-cyclohexen-1-yl-methyl, 2,6-dimethyl-2-cyclohexen-1-yl, 2-ethyl-2-cyclohexen-1-yl, 2-cycloocten-1-yl, 2,6,6-trimethyl-2-cyclohexen-1-yl, 2-cyclononen-1-yl, 4-(2-cyclopenten-1-yl)butyl, 2-cyclodecen-1-yl, 2-cycloundecen-1-yl, 2-cyclododecen-1-yl, styryl, cinnamyl, 2-, 3-, and 4-methoxystyryl, 3,4-dimethoxystyryl, 3,4,5-trimethoxystyryl, 2-, 3-, and 4-methoxycinnamyl, 3,4-dimethoxycinnamyl, and 3,4,5-trimethoxycinnamyl, there are obtained the corresponding 3,7-di($R_5$)-3,7-diazatricyclo-[4.2.2.2$^{2,5}$]dodeca-9,11-diene-4,8-diones and the corresponding 3,7 - di($R_6$) - 3,7 - diazatricyclo[4.2.2.2$^{2,5}$]dodecane - 4,8 - diones and 3,7 - di($R_6$) - 3,7 - diazatricyclo[4.2.2.2$^{2,5}$]dodecanes wherein $R_6$ is sec. butyl, isobutyl, butyl, butyl, 1,2-dimethylpropyl, 1,1-dimethylpropyl, 2-methylbutyl, 1-methylbutyl, 2-methylbutyl, isopentyl, pentyl, 2,3-dimethylbutyl, 1,1,2-trimethylpropyl, 1,3-dimethylbutyl, isohexyl, 1-ethylbutyl, 2-ethylpentyl, 4,4-dimethylpentyl, 2-methylheptyl, 4-ethyl-4-methylhexyl, 4-methylundecyl, 5,5,7,7-tetramethyloctyl, cyclobutyl, cyclobutylmethyl, cyclopentyl, 2-methylcyclopentyl, 2-methylcyclohexyl, 3-methylcyclohexyl, 4-methylcyclohexyl, 2-methylcyclohexyl, 2-cyclohexylethyl, cyclohexylmethyl, 2-6-dimethylcyclohexyl, 2-ethylcyclohexyl, cyclooctyl, 2,2,6-trimethylcyclohexyl, cyclononyl, 4-cyclopentylbutyl, cyclodecyl, cycloundecyl, cyclododecyl, phenethyl, 3-phenylpropyl, 2-, 3-, and 4-methoxyphenethyl, 3,4-dimethoxyphenethyl, 3,4,5-trimethoxyphenethyl, 3-(2-, 3-, and 4-methoxyphenyl)propyl, 3-(3,4-dimethoxyphenyl)propyl, and 3-(3,4,5-trimethoxyphenyl)propyl, respectively.

By substituting the 2-pyridione in the above example by other pyridones of the formula:

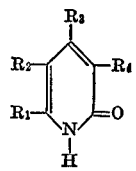

for example, wherein $R_1$ is methyl or ethyl and $R_2$, $R_3$, and $R_4$ are hydrogen; $R_2$ is methyl or ethyl and $R_1$, $R_3$, and $R_4$ are hydrogen; $R_3$ is methyl or ethyl and $R_1$, $R_2$, and $R_4$ are hydrogen; $R_4$ is methyl or ethyl and $R_1$, $R_2$, and $R_3$ are hydrogen; or where $R_1$, $R_2$, $R_3$, and $R_4$ are methyl or ethyl, the corresponding 3,7-di($R_5$)-2,6-di($R_7$)-; 3,7-di($R_5$)-10,12-di($R_7$)-; 3,7-di($R_5$)-9,11-di($R_7$)-; 3,7-di($R_5$)-1,5-di($R_7$)-; and 3,7-di($R_5$)-1,2,5,6,9,10,11,12-octa($R_7$) - 3,7 - diazatricyclo[4.2.2.2$^{2,5}$]dodeca - 9,11 - diene-4,8-diones wherein $R_5$ is as listed above and $R_7$ is methyl or ethyl are obtained.

On hydrogenation and reduction with lithium aluminum hydride as above, there are obtained the corresponding 3,7-di($R_6$)-3,7-diazatricyclo[4.2.2.2$^{2,5}$]dodecane-4,8-diones and dodecanes and 3,7-di($R_6$)-2,6-di($R_7$)-; 3,7-di($R_6$)-10,12-di($R_7$)-; and 3,7-di($R_6$)-9,11-di($R_7$)-; 3,7-di($R_6$)-1,5-di($R_7$)-; and 3,7-di($R_6$)-1,2,5,6,9,10,11,12-octa($R_7$) - 3,7 - diazatricyclo[4.2.2.2$^{2,5}$]dodecane - 4,8-diones and dodecanes; wherein $R_6$ and $R_7$ are as given above.

All of the above compounds, except those having methyl or ethyl substituents in the two and six positions have point symmetry.

While I have described the preparation of the compounds containing $R_6$ by the hydrogenation of a corresponding unsaturated radical, $R_5$, it is to be understood that these compounds are not limited by the process as other processes for their preparation, for example, where the starting 2-pyridone has an $R_6$ group in place of the $R_5$ group, can be used.

I claim:
1. A compound of the formula:

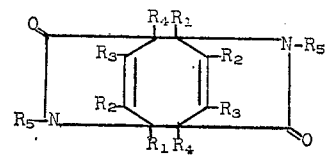

I wherein $R_1$ is selected from the group consisting of hydrogen, methyl, and ethyl; $R_2$ is selected from the group consisting of hydrogen, methyl, and ethyl; $R_3$ is selected from the group consisting of hydrogen, methyl, and ethyl; $R_4$ is selected from the group consisting of hydrogen, methyl and ethyl; and $R_5$ contains 3 to 12 carbon atoms, inclusive, and is selected from the group consisting of alkenyl, cycloalkenyl, aralykenyl, and (alkoxy)$_n$-aralkenyl wherein $n$ is an integer of from 1 to 3, inclusive, said cycloalkenyl and aralkenyl being hydrocarbon.

2. 3,7 - diallyl - 3,7 - diazatricyclo[4.2.2.2$^{2,5}$]dodeca-9,11-diene-4,8-dione.

3. The process of producing a compound of Formula I which comprises irradiating a compound of the formula:

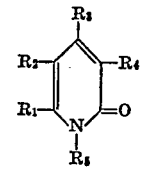

IV wherein $R_1$, $R_2$, $R_3$, $R_4$, and $R_5$ are as in claim 1 with ultraviolet radiation.

4. The process of producing compounds of the formula:

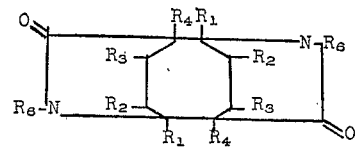

II wherein $R_1$ is selected from the group consisting of hydrogen, methyl, and ethyl; $R_2$ is selected from the group consisting of hydrogen, methyl, and ethyl; $R_4$ is selected from the group consisting of hydrogen, methyl and ethyl; and $R_6$ contains 3 to 12 carbon atoms, inclusive, and is selected from the group consisting of alkyl, cycloalkyl, aralkyl, and (alkoxy)$_n$-aralkyl wherein $n$ is an integer of from 1 to 3, inclusive, said cycloalkyl and aralkyl being hydrocarbon which comprises irradiating a compound of the following formula:

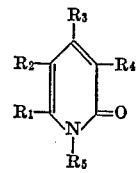

IV wherein $R_1$, $R_2$, $R_3$, and $R_4$ are as given above and $R_5$ contains 3 to 12 carbon atoms, inclusive, and is selected from the group consisting of alkenyl, cycloalkenyl, aralkenyl, and (alkoxy)$_n$-aralkenyl wherein $n$ is an integer of from 1 to 3, inclusive, said cycloalkenyl and aralkenyl being hydrocarbon, with ultraviolet radiation and hydrogenating the resulting dimer with hydrogen in the presence of a catalyst effective to saturate an olefinic double bond.

5. The process of producing compounds of Formula II which comprises hydrogenating a compound of the following formula:

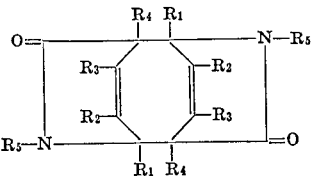

wherein $R_1$, $R_2$, $R_3$, $R_4$, and $R_5$ are as defined in claim 4 with hydrogen in the presence of a catalyst effective to saturate an olefinic double bond.

6. The process for producing compounds of the formula:

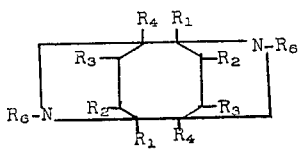

wherein $R_1$, $R_2$, $R_3$, $R_4$, $R_5$, and $R_6$ are as in claim 4 which comprises irradiating a compound of Formula IV wherein $R_1$, $R_2$, $R_3$, $R_4$ and $R_5$ are as in claim 4, with ultraviolet radiation, hydrogenating the resulting dimer with hydrogen in the presence of a catalyst effective to saturate an olefinic double bond, and reducing the resulting compound with lithium aluminum hydride.

7. The process for producing compounds of Formula III which comprises hydrogenating a compound of Formula I wherein $R_1$, $R_2$, $R_3$, $R_4$, and $R_5$ are as in claim 4 with hydrogen in the presence of a catalyst effective to saturate an olefinic double bond to form a compound of Formula II wherein $R_1$, $R_2$, $R_3$, $R_4$, and $R_6$ are as in claim 4 and reducing the resulting compound with lithium aluminum hydride to form a compound of Formula III wherein $R_1$, $R_2$, $R_3$, $R_4$, and $R_6$ are as in claim 4.

References Cited

Ayer et al.: "Tetrahedron Letters," 1961, pp. 648–53.

HENRY R. JILES, *Primary Examiner.*

ROBERT T. BOND, *Assistant Examiner.*

U.S. Cl. X.R.

204—158; 252—292; 260—295, 294, 999